(12) United States Patent
Rose et al.

(10) Patent No.: US 8,499,875 B2
(45) Date of Patent: Aug. 6, 2013

(54) ENERGY STORAGE SYSTEM FOR A HYBRID VEHICLE

(75) Inventors: Kenric B. Rose, Howell, MI (US); William G. Spadafora, Clarkston, MI (US); Edward J. Greif, Waterford, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/613,110

(22) Filed: Sep. 13, 2012

(65) Prior Publication Data
US 2013/0008152 A1    Jan. 10, 2013

Related U.S. Application Data

(62) Division of application No. 12/361,236, filed on Jan. 28, 2009, now Pat. No. 8,302,720.

(51) Int. Cl.
*B60K 6/12* (2006.01)

(52) U.S. Cl.
USPC .......................... 180/165; 123/179.31; 60/413

(58) Field of Classification Search
USPC ............... 180/165; 60/413, 414; 123/179.31
See application file for complete search history.

(56) References Cited

U.S. PATENT DOCUMENTS

| | | |
|---|---|---|
| 3,665,788 A | 5/1972 | Nyman |
| 3,695,731 A | 10/1972 | England et al. |
| 3,917,027 A | 11/1975 | Hakanson et al. |
| 4,064,694 A | 12/1977 | Baudoin |
| 4,098,144 A | 7/1978 | Besel et al. |
| 4,132,283 A | 1/1979 | McCurry |
| 4,199,950 A | 4/1980 | Hakanson et al. |
| 4,227,587 A | 10/1980 | Carman |
| 4,235,216 A | 11/1980 | Miles |
| 4,347,813 A | 9/1982 | Maucher et al. |
| 4,350,220 A | 9/1982 | Carman |

(Continued)

FOREIGN PATENT DOCUMENTS

| | | |
|---|---|---|
| DE | 102007012130 | 11/2007 |
| DE | 102007032316 | 1/2009 |

(Continued)

OTHER PUBLICATIONS

Spirax Sarco, "Module 12.2 Isolation Valves—Rotary Movement," Mar. 29, 2007, 14 pages.

(Continued)

*Primary Examiner* — John Walters
(74) *Attorney, Agent, or Firm* — Michael Best & Friedrich LLP

(57) ABSTRACT

An energy storage system, for a hybrid vehicle including an internal combustion engine having an output shaft and a transmission operably coupled to the output shaft, includes a reservoir containing working fluid, a reversible pump/motor in fluid communication with the reservoir, a first clutch selectively drivably coupling the output shaft of the engine and the reversible pump/motor, a second clutch selectively drivably coupling an output shaft of the transmission and the reversible pump/motor, and an accumulator containing working fluid and gas. The accumulator is in fluid communication with the reversible pump/motor to deliver pressurized working fluid to the reversible pump/motor when operating as a motor to drive one of the respective output shafts of the engine and the transmission, and to receive pressurized working fluid discharged by the reversible pump/motor when operating as a pump driven by the one of the respective output shafts of the engine and the transmission.

6 Claims, 6 Drawing Sheets

U.S. PATENT DOCUMENTS

| | | | |
|---|---|---|---|
| 4,351,152 A | 9/1982 | Reynolds et al. | |
| 4,373,332 A | 2/1983 | Holmen | |
| 4,406,951 A | 9/1983 | Inoue | |
| 4,441,573 A | 4/1984 | Carman et al. | |
| 4,487,173 A | 12/1984 | Maucher et al. | |
| 4,534,169 A | 8/1985 | Hunt | |
| 4,543,923 A | 10/1985 | Hamano et al. | |
| 4,580,534 A | 4/1986 | Blum et al. | |
| 4,741,410 A | 5/1988 | Tunmore | |
| 4,798,086 A | 1/1989 | Styfhoorn | |
| 4,813,510 A | 3/1989 | Lexen | |
| 5,088,041 A | 2/1992 | Tanaka et al. | |
| 5,103,671 A | 4/1992 | Dyvig | |
| 5,152,142 A | 10/1992 | Budzich | |
| 5,310,017 A | 5/1994 | Tobias | |
| 5,404,717 A | 4/1995 | Nogi et al. | |
| 5,492,189 A | 2/1996 | Kriegler et al. | |
| 5,495,912 A * | 3/1996 | Gray et al. | 180/165 |
| 5,507,144 A | 4/1996 | Gray, Jr. et al. | |
| 5,823,281 A | 10/1998 | Yamaguchi et al. | |
| 6,054,776 A | 4/2000 | Sumi | |
| 6,135,913 A | 10/2000 | Lyon | |
| 6,139,458 A | 10/2000 | Simmons | |
| 6,170,587 B1 | 1/2001 | Bullock | |
| 6,454,033 B1 | 9/2002 | Nathan et al. | |
| 6,460,500 B1 | 10/2002 | Ooyama et al. | |
| 6,481,329 B2 | 11/2002 | Porter | |
| 6,543,311 B1 | 4/2003 | Baginski et al. | |
| 6,615,786 B2 | 9/2003 | Mori et al. | |
| 6,705,266 B2 | 3/2004 | Tachikawa et al. | |
| 6,712,166 B2 | 3/2004 | Rush et al. | |
| 6,719,080 B1 | 4/2004 | Gray, Jr. | |
| 6,736,099 B2 | 5/2004 | Mori et al. | |
| 6,962,050 B2 | 11/2005 | Hiraki et al. | |
| 7,044,257 B2 | 5/2006 | Kempf et al. | |
| 7,086,266 B2 | 8/2006 | Munoz et al. | |
| 7,117,836 B2 | 10/2006 | Foster | |
| 7,147,078 B2 | 12/2006 | Teslak et al. | |
| 7,273,122 B2 | 9/2007 | Rose | |
| 7,296,407 B2 | 11/2007 | Rose | |
| 7,467,697 B2 * | 12/2008 | Elie et al. | 192/21.5 |
| 2002/0166530 A1 | 11/2002 | Tachikawa et al. | |
| 2002/0166532 A1 | 11/2002 | Mori et al. | |
| 2003/0000492 A1 | 1/2003 | Mori et al. | |
| 2003/0103850 A1 | 6/2003 | Szulczewski | |
| 2003/0173133 A1 | 9/2003 | Kempt et al. | |
| 2005/0036894 A1 | 2/2005 | Oguri | |
| 2006/0053790 A1 | 3/2006 | Foster | |
| 2006/0068970 A1 | 3/2006 | Rose | |
| 2006/0079375 A1 | 4/2006 | Marshall et al. | |
| 2006/0157010 A1 | 7/2006 | Moriwaki et al. | |
| 2007/0018499 A1 | 1/2007 | Kokubo et al. | |
| 2007/0111849 A1 | 5/2007 | Ji | |
| 2009/0076690 A1 | 3/2009 | Guo et al. | |
| 2009/0283348 A1 * | 11/2009 | Ossyra | 180/165 |

FOREIGN PATENT DOCUMENTS

| | | |
|---|---|---|
| FR | 2467095 | 4/1981 |
| JP | 61042247 | 2/1986 |
| JP | 01035102 | 2/1989 |
| JP | 3262726 | 11/1991 |
| WO | 00/02743 | 1/2000 |
| WO | 02/095243 | 11/2002 |
| WO | 2006055978 | 5/2006 |
| WO | 2007079642 | 7/2007 |
| WO | 2007/124882 | 11/2007 |
| WO | 2008/045468 | 4/2008 |

OTHER PUBLICATIONS

Spirax Sarco, "Module 6.6 Control Valve Actuators and Positioners," Apr. 3, 2007, 20 pages.

Bosch Rexroth Corporation, "Variable Displacement Pump Axial Piston—Swashplate Design," Model A4VSO specification sheet, Oct. 1997, 7 pages, admitted prior art.

Hewko, L. O., et al., "Hydraulic Energy Storage Based Hybrid Propulsion System for a Terrerstrial Vehicle" research paper, Aug. 12, 1990, pp. 99-105.

International Search Report and Written Opinion for PCTIUS2009/065875, Jul. 6, 2010, 11 pages.

Office Action from the United States Patent and Trademark Office for U.S. Appl. No. 12/361,236 dated May 23, 2012 (11 pages).

Office Action from the United States Patent and Trademark Office for U.S. Appl. No. 12/361,236 dated Dec. 13, 2011 (10 pages).

Office Action from the United States Patent and Trademark Office for U.S. Appl. No. 12/361,236 dated Aug. 10, 2011 (9 pages).

Office Action from the United States Patent and Trademark Office for U.S. Appl. No. 12/361,236 dated Jul. 22, 2011 (5 pages).

* cited by examiner

ENERGY STORAGE SYSTEM FOR A HYBRID VEHICLE

CROSS-REFERENCE TO RELATED APPLICATIONS

This application is a divisional of co-pending U.S. patent application Ser. No. 12/361,236 filed Jan. 28, 2009, the entire content of which is incorporated herein by reference.

FIELD OF THE INVENTION

The present invention relates to hybrid drive systems for vehicles and more particularly to hybrid hydraulic drive systems for vehicles.

BACKGROUND OF THE INVENTION

A typical vehicle hybrid hydraulic drive system uses a reversible pump/motor to absorb power from and add power to or assist a conventional vehicle drive system. The system absorbs power by pumping hydraulic fluid from a low pressure reservoir into a hydraulic energy storage system. This hydraulic energy storage system typically includes one or more nitrogen-charged hydraulic accumulators. Hybrid hydraulic drive systems typically add power to conventional vehicle drive systems by utilizing the hydraulic energy stored in the hydraulic accumulators to drive the reversible pump/motor as a motor.

SUMMARY OF THE INVENTION

The present invention provides, in one aspect, an energy storage system for a hybrid vehicle including an internal combustion engine having an output shaft and a transmission operably coupled to the output shaft. The energy storage system includes a reservoir containing working fluid, a reversible pump/motor in fluid communication with the reservoir, a first clutch selectively drivably coupling the output shaft of the engine and the reversible pump/motor, a second clutch selectively drivably coupling an output shaft of the transmission and the reversible pump/motor, and an accumulator containing working fluid and gas. The accumulator is in fluid communication with the reversible pump/motor to deliver pressurized working fluid to the reversible pump/motor when operating as a motor to drive one of the respective output shafts of the engine and the transmission, and to receive pressurized working fluid discharged by the reversible pump/motor when operating as a pump driven by the one of the respective output shafts of the engine and the transmission.

The present invention provides, in another aspect, a method of operating a hybrid vehicle including an internal combustion engine having an output shaft and a transmission operably coupled to the output shaft. The method includes providing an accumulator containing working fluid and gas, providing a reversible pump/motor, selectively drivably coupling the output shaft of the engine and the reversible pump/motor to operate the reversible pump/motor at a first speed, selectively drivably coupling an output shaft of the transmission and the reversible pump/motor to operate the reversible pump/motor at a second speed different than the first speed, and discharging pressurized working fluid from the accumulator to the reversible pump/motor when operating as a motor, and receiving pressurized working fluid discharged by the reversible pump/motor when operating as a pump.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
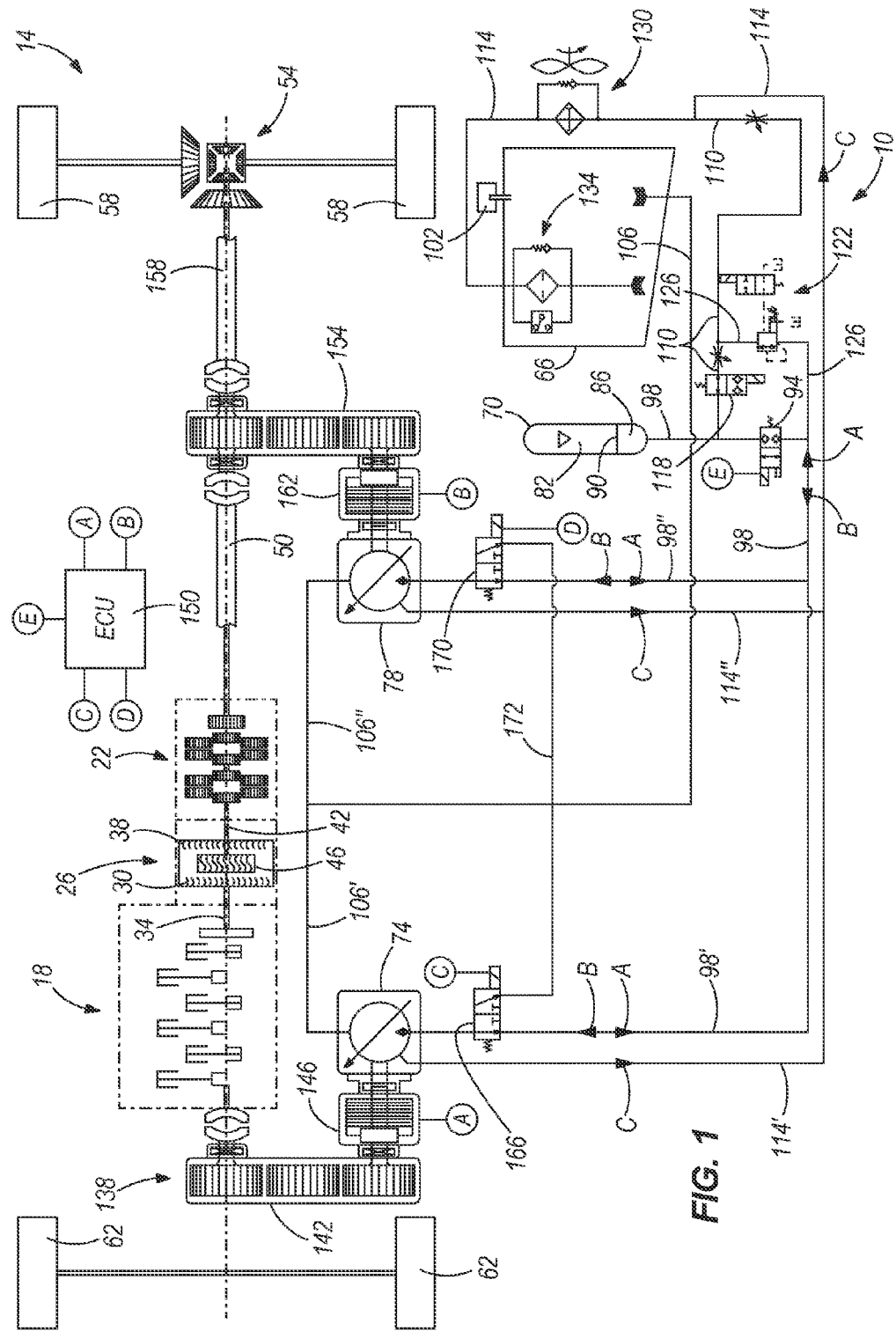
FIG. 1 is a schematic of a first construction of an energy storage system for a hybrid vehicle of the present invention.

FIG. 1 illustrates a schematic of a first construction of an energy storage system 10 for a hybrid vehicle 14 including an internal combustion engine 18 and a multi-speed transmission 22 (e.g., a planetary automatic transmission 22 utilizing a torque converter 26) coupled to the engine 18. Specifically, as shown in FIG. 1, the torque converter 26 includes a pump or turbine 30 non-rotatably coupled to an output shaft 34 (e.g., a crankshaft) of the engine 18, an impeller 38 non-rotatably coupled to an input shaft 42 of the transmission 22, and a stator 46. Alternatively, the transmission 22 may be configured as a manual transmission. The transmission 22 further includes an output shaft 50 that transfers power from the transmission 22 to a rear differential 54 in the vehicle's driveline. A pair of rear wheels 58 is driven by the rear differential 54 in a conventional manner. Although not shown, a front differential in combination with a secondary gearbox (e.g., a four-wheel drive transfer case) may transfer power from the engine 18 to a pair of front wheels 62 of the vehicle 14.

The energy storage system 10 illustrated in FIG. 1 is configured as a parallel hydraulic regenerative drive system including a reservoir 66, an accumulator 70 in selective fluid communication with the reservoir 66, and dual reversible pump/motors 74, 78 operably coupled to the accumulator 70. Each of the reversible pump/motors 74, 78 is configured as a variable displacement, axial-piston, swashplate-design pump/motor, such as a Bosch Rexroth Model No. A4VSO variable displacement, axial piston reversible pump/motor. Each of the reversible pump/motors 74, 78 includes a different maximum displacement and a maximum permissible operating speed. In the illustrated construction of the system, the first reversible pump/motor 74 is sized having a maximum displacement of 125 cubic centimeters per revolution ("cc/rev") of the input shaft of the pump/motor 74, and the second reversible pump/motor 78 is sized having a maximum displacement of 355 cc/rev of the input shaft of the pump/motor 78. Alternatively, the first and second reversible pump/motors 74, 78 may be sized having different maximum displacements depending upon the particular configuration or size of the vehicle 14. Further, one or both of the reversible pump/motors 74, 78 may be configured having a constant displacement rather than a variable displacement.

With continued reference to FIG. 1, the accumulator 70 includes a first chamber 82 containing a gas (e.g. nitrogen, etc.), a second chamber 86 containing a working fluid (e.g. hydraulic fluid, etc.), and a movable piston 90 separating the chambers 82, 86 (schematically illustrated as a line between the chamber 82 and the chamber 86). Alternatively, the accumulator 70 may be configured with a bladder or a diaphragm rather than the piston 90. The system 10 also includes an isolation valve 94 in fluid communication with the working fluid chamber 86 in the accumulator 70 by a fluid passageway 98. The isolation valve 94 may be configured as a poppet valve, ball valve, spool valve, gate valve, cartridge valve, needle valve, block valve, etc. Further, the isolation valve 94 is solenoid-actuated to open and spring-biased to close.

With continued reference to FIG. 1, the reservoir 66 contains working fluid and includes a breather 102. The breather 102 provides venting of the space above the working fluid in the reservoir 66 as the level of working fluid fluctuates during operation of the system 10. The breather 102 is exposed to the atmosphere, such that gas in the reservoir 66 may be vented to the atmosphere, and replacement air may be allowed to enter the reservoir 66 when the level of working fluid in the reservoir 66 decreases. Alternatively, the breather 102 may be fluidly connected to an auxiliary tank or vessel (not shown) to contain gas vented from the reservoir 66, or the reservoir 66 may be pressurized from an external source. The reservoir 66 is in fluid communication with the reversible pump/motors 74, 78 by separate fluid passageways 106, 114. Another fluid passageway 110 selectively fluidly communicates the accumulator 70 and the reservoir 66, and another isolation valve 118 is positioned in the fluid passageway 110. In addition, a pressure relief valve 122 is positioned in a fluid passageway 126 providing a bypass from the fluid passageway 98 to the fluid passageway 110. A heat exchanger 130 and a working fluid filter 134 are in fluid communication with the reversible pump/motors 74, 78 and the reservoir 66 and are situated in the fluid passageway 114.

With continued reference to FIG. 1, the first reversible pump/motor 74 is drivably coupled to the output shaft 34 of the engine 18 at a location forward of the transmission 22 (i.e., relative to the front and rear of the vehicle 14). Specifically, the reversible pump/motor 74 is drivably coupled to an accessory drive system 138 located near the front of the engine 18. Alternatively, in a transverse mounting arrangement of the engine 18, the reversible pump/motor 74 may be drivably coupled to an accessory drive system located near the side of the engine 18 relative to its placement in the vehicle 14. The accessory drive system 138 may include a plurality of engine accessories (e.g., an alternator, an air-conditioning compressor, an air pump, a coolant pump etc.), a plurality of pulleys non-rotatably coupled to each of the respective accessories, and one or more belts arranged to at least partially wrap around each of the pulleys to power the respective accessories. The accessory drive system 138 also includes an offset gearbox 142 operable to transfer torque between the output shaft 34 of the engine 18 and the first reversible pump/motor 74. Although the illustrated offset gearbox 142 is configured having a 1:1 input/output ratio, the gearbox 142 may be configured having a lower or higher input/output ratio.

Also, in the illustrated construction of the system 10, a clutch 146 is positioned between the first reversible pump/motor 74 and the output shaft 34 of the engine 18 to allow the first reversible pump/motor 74 to be selectively drivably coupled to the engine output shaft 34. As shown in FIG. 1, an engine control unit 150 (i.e., "ECU") of the vehicle 14 is operable to selectively actuate the clutch 146 between a disengaged configuration, in which no torque transfer occurs between the engine output shaft 34 and the first reversible pump/motor 74, and an engaged configuration, in which torque transfer occurs between the engine output shaft 34 and the first reversible pump/motor 74. The clutch 146 may be configured as an electric clutch or an electromagnetic clutch operable to interface directly with the ECU 150, or the clutch 146 may be pneumatically or hydraulically actuated by the ECU 150 through an intermediate controller (not shown). Also, the ECU 150 may control the degree of engagement of the clutch 146 (e.g., by controlling the amount of voltage or fluid pressure delivered to the clutch 146), such that a variable amount of torque may be transferred between the engine output shaft 34 and the first reversible pump/motor 74 due to a controlled amount of slippage in the clutch 146. The connection between the ECU 150 and the clutch 146 (indicated by letter "A") may be wired or wireless (for an electric or electromagnetic clutch configuration), or, the connection between the ECU 150 and the intermediate controller for the pneumatically or hydraulically-actuated clutch 146 may be wired or wireless.

With continued reference to FIG. 1, the second reversible pump/motor 78 is drivably coupled to the output shaft 50 of the transmission 22 at a location rearward of the transmission 22 (i.e., relative to the front and rear of the vehicle 14). Like the first reversible pump/motor 74 described above, the second reversible pump/motor 78 is drivably coupled to the transmission output shaft 50 via an offset gearbox 154 operable to transfer torque between the transmission output shaft 50 and the second reversible pump/motor 78. Although the illustrated offset gearbox 154 is configured having a 1:1 input/output ratio, the gearbox 154 may be configured having a lower or higher input/output ratio. Another output shaft 158 interconnects the offset gearbox 154 and the rear differential 54. Alternatively, the output shaft 158 may be omitted, and the gearbox 154 may be directly coupled to the rear differential 54. As a further alternative, the output shaft 50 may be omitted and the gearbox 154 may be directly coupled to the transmission 22.

Also, in the illustrated construction of the system 10, a clutch 162 is positioned between the second reversible pump/motor 78 and the output shaft 50 of the transmission 22 to allow the second reversible pump/motor 78 to be selectively drivably coupled to the transmission output shaft 50. In a manner similar to that described above with respect to the first reversible pump/motor 74, the ECU 150 is operable to selectively actuate the clutch 162 between a disengaged configuration, in which no torque transfer occurs between the transmission output shaft 50 and the second reversible pump/motor 78, and an engaged configuration, in which torque transfer occurs between the transmission output shaft 50 and the second reversible pump/motor 78. The clutch 162 may be configured as an electric clutch or an electromagnetic clutch operable to interface directly with the ECU 150, or the clutch 162 may be pneumatically or hydraulically actuated by the ECU 150 through an intermediate controller (not shown). The ECU 150 may control the degree of engagement of the clutch 162, such that a variable amount of torque may be transferred between the transmission output shaft 50 and the second reversible pump/motor 78 due to a controlled amount of slippage in the clutch 162. The connection between the ECU 150 and the clutch 162 (indicated by letter "B") may be wired or wireless (for an electric or electromagnetic clutch configuration), or, the connection between the ECU 150 and the intermediate controller for the pneumatically or hydraulically-actuated clutch 162 may be wired or wireless.

With continued reference to FIG. 1, the first reversible pump/motor 74 is in fluid communication with the reservoir 66 to receive low-pressure working fluid via the fluid passageway 106 and a fluid passageway branch 106'. Likewise, the second reversible pump/motor 78 is in fluid communication with the reservoir 66 to receive low-pressure working fluid via the fluid passageway 106 and a fluid passageway branch 106". As such, the first and second reversible pump/motors 74, 78 draw low-pressure working fluid from the reservoir 66 in parallel with each other. Alternatively, separate, dedicated fluid passageways may be utilized for each of the reversible pump/motors 74, 78 to draw low-pressure working fluid from the reservoir 66.

Further, the first reversible pump/motor 74 is in fluid communication with the accumulator 70 via the fluid passageway 98 and a fluid passageway branch 98' to deliver pressurized working fluid to the accumulator 70 when operating as a pump, and to receive pressurized working fluid from the accumulator 70 when operating as a motor. Likewise, the second reversible pump/motor 78 is in fluid communication with the accumulator 70 via the fluid passageway 98 and a fluid passageway branch 98" to deliver pressurized working fluid to the accumulator 70 when operating as a pump, and to receive pressurized working fluid from the accumulator 70 when operating as a motor. As such, the first and second reversible pump/motors 74, 78 may discharge pressurized working fluid to the accumulator 70 in parallel with each other and receive pressurized working fluid from the accumulator 70 in parallel with each other. Alternatively, separate, dedicated fluid passageways may be utilized for each of the reversible pump/motors 74, 78 to discharge pressurized working fluid to the accumulator 70 or receive pressurized working fluid from the accumulator 70.

With continued reference to FIG. 1, the first reversible pump/motor 74 is also in fluid communication with the reservoir 66 to return low-pressure working fluid to the reservoir 66 via the fluid passageway 114 and a fluid passageway branch 114'. Likewise, the second reversible pump/motor 78 is in fluid communication with the reservoir 66 to return low-pressure working fluid to the reservoir 66 via the fluid passageway 114 and a fluid passageway branch 114". As such, the first and second reversible pump/motors 74, 78 may return low-pressure working fluid to the reservoir 66 in parallel with each other. Alternatively, separate, dedicated fluid passageways may be utilized for each of the reversible pump/motors 74, 78 to return low-pressure working fluid to the reservoir 66.

The energy storage system 10 also includes isolation valves 166, 170 positioned in the respective fluid passageway branches 98', 98" to selectively block the flow of working fluid through the fluid passageway branches 98', 98". The isolation valves 166, 170 may be configured as poppet valves, ball valves, spool valves, gate valves, cartridge valves, needle valves, block valves, etc. Further, each of the isolation valves 166, 170 is solenoid-actuated to open and spring-biased to close. The ECU 150 controls the actuation of the valves 166, 170 to open the valves 166, 170 and to allow the valves 166, 170 to close. The connection between the ECU 150 and each of the valves 166, 170 (indicated by letters "C" and "D," respectively) may be wired or wireless. In addition, the connection between the ECU 150 and the valve 94 (indicated by letter "E") may be wired or wireless. In addition, each of the isolation valves 166, 170 is selectively fluidly connected to the passageway 106 via a passageway 172 to provide a leak path to the reservoir 66 should one or both of the isolation valves 166, 170 fail.

By positioning the first reversible pump/motor 74 forward or upstream of the transmission 22 and the second reversible pump/motor 78 rearward or downstream of the transmission 22, the energy storage system 10 is operable in several different modes. In a first mode, for example, when it is desired to decelerate or reduce the speed of the vehicle 14, the second reversible pump/motor 78 is operable as a pump driven by the vehicle's axle or driveline (i.e., the rear wheels 58, rear differential 54, and the transmission output shafts 50, 158) to recover the kinetic energy of the vehicle 14. Upon sensing the braking or equivalent energy-absorption condition, the ECU 150 engages the clutch 162 and actuates the isolation valves 94, 170 to open the valves 94, 170. Then, the second reversible pump/motor 78 draws low-pressure working fluid from the reservoir 66 through the fluid passageway 106, through the fluid passageway branch 106", and pressurizes the working fluid. The resultant pressurized working fluid is discharged from the reversible pump/motor 78, flows through the fluid passageway branch 98" in the direction of arrow A before converging into the fluid passageway 98, through the fluid passageway 98, through the isolation valve 94, and into the working fluid chamber 86 of the accumulator 70. The isolation valve 118 in the fluid passageway 110 remains closed to prevent the pressurized working fluid from returning to the reservoir 66. As the pressurized working fluid flows into the accumulator 70, the piston 90 is displaced upwardly, thereby compressing the gas in the accumulator 70. The work performed by the piston 90 to compress the gas is stored for later use to power the axle or driveline of the vehicle 14. Alternatively, the stored energy in the accumulator 70 may be used to provide power to an auxiliary hydraulic system of the vehicle 14 (e.g., a tailgate lift or hoist, a winch, a hydraulic cylinder, etc.). As a further alternative, the pressurized working fluid provided by the second reversible pump/motor 78 may be immediately used, rather than being stored in the accumulator 70, to provide power to the vehicle's auxiliary hydraulic system.

Of course, this mode of operation of the system 10 is only available when the vehicle 14 is moving because an input torque to the second reversible pump/motor 78 is required to operate the pump/motor 78 as a pump. However, because the first reversible pump/motor 74 is positioned forward of the transmission 22, the first reversible pump/motor 74 may be provided with a torque input from the engine 18 when the vehicle 14 is either stationary or moving. As such, in another mode of operation of the system 10, the first reversible pump/motor 74 is operable as a pump to recover the rotational kinetic energy of the engine output shaft 34 when ignition to the engine 18 is turned off (e.g., when the vehicle is decelerating or stationary to reduce extended periods of engine idling). In yet another mode of operation of the system 10, the first reversible pump/motor 74 is operable as a pump using a torque input from the engine 18 to provide pressurized working fluid, either directly or via the accumulator 70, to the auxiliary hydraulic system of the vehicle 14 to power the auxiliary hydraulic system regardless of whether the vehicle 14 is stationary or moving. In a further mode of operation of the system 10, the first reversible pump/motor 74 is operable as a pump using a torque input from the engine 18 to provide pressurized working fluid to the accumulator 70 to pre-charge the accumulator 70 prior to movement of the vehicle 14.

To operate the first reversible pump/motor 74 as a pump under any of the above-described modes of operation of the system 10, the ECU 150 engages the clutch 146 and actuates the isolation valves 94, 166 to open the valves 94, 166. Then, the first reversible pump/motor 74 draws low-pressure working fluid from the reservoir 66 through the fluid passageway 106, through the fluid passageway branch 106', and pressurizes the working fluid. The resultant pressurized working fluid is discharged from the reversible pump/motor 74, flows through the fluid passageway branch 98' in the direction of arrow A before converging into the fluid passageway 98, through the fluid passageway 98, through the isolation valve 94, and into the working fluid chamber 86 of the accumulator 70. The isolation valve 118 in the fluid passageway 110 remains closed to prevent the pressurized working fluid from returning to the reservoir 66.

In a mode of operation of the system 10 in which both of the reversible pump/motors 74, 78 are operating as pumps using torque inputs from the engine output shaft 34 and the transmission output shaft 50, respectively, the ECU 150 may control the torque input delivered to each of the reversible pump/motors 74, 78 (e.g., by varying the engagement of the respective clutches 146, 162) to provide an optimized flow rate of the pressurized working fluid produced by the combination of the first and second reversible pump/motors 74, 78. Table 1 below illustrates the maximum flow rates that the first and second reversible pump/motors 74, 78 (i.e., the "engine-driven pump/motor" and the "driveline-driven pump/motor," respectively) are capable of creating, with respect to the rotational speed of the engine 18 and the particular gear ratio of the transmission 22. The values used for the transmission gear ratios include: 6.34:1 first gear; 3.44:1 second gear; 1.71:1 third gear; 1:1 fourth gear; and 0.78:1 fifth gear.

TABLE 1

| Engine Speed (rpm) | Engine-driven pump/motor flow rate (liters/min) | Driveline-driven pump/motor flow rate (liters/min; 1st gear) | Driveline-driven pump/motor flow rate (liters/min; 2nd gear) | Driveline-driven pump/motor flow rate (liters/min; 3rd gear) | Driveline-driven pump/motor flow rate (liters/min; 4th gear) | Driveline-driven pump/motor flow rate (liters/min; 5th gear) |
|---|---|---|---|---|---|---|
| 0 | 0 | No fluid output when vehicle is idling and stationary | | | | |
| 100 | 13 | | | | | |
| 200 | 25 | | | | | |
| 300 | 38 | | | | | |
| 400 | 50 | | | | | |
| 500 | 63 | | | | | |
| 600 | 75 | | | | | |
| 700 | 88 | 39 | 72 | 145 | 249 | 319 |
| 800 | 100 | 45 | 83 | 166 | 284 | 364 |
| 900 | 113 | 50 | 93 | 187 | 320 | 410 |
| 1000 | 125 | 56 | 103 | 208 | 355 | 455 |
| 1100 | 138 | 62 | 114 | 228 | 391 | 501 |
| 1200 | 150 | 67 | 124 | 249 | 426 | 546 |
| 1300 | 163 | 73 | 134 | 270 | 462 | 592 |
| 1400 | 175 | 78 | 144 | 291 | 497 | |
| 1500 | 188 | 84 | 155 | 311 | 533 | |
| 1600 | 200 | 90 | 165 | 332 | 568 | |
| 1700 | 213 | 95 | 175 | 353 | 604 | |
| 1800 | 225 | 101 | 186 | 374 | These values exceed the maximum permissible operating speed of the Rexroth A4VSO 355 cc/rev pump/motor | |
| 1900 | 238 | 106 | 196 | 394 | | |
| 2000 | 250 | 112 | 206 | 415 | | |
| 2100 | 263 | 118 | 217 | 436 | | |
| 2200 | 275 | 123 | 227 | 457 | | |
| 2300 | These values exceed the maximum permissible operating speed of the Rexroth A4VSO 125 cc/rev pump/motor | 129 | 237 | 477 | | |
| 2400 | | 134 | 248 | 498 | | |
| 2500 | | 140 | 258 | 519 | | |
| 2600 | | 146 | 268 | 540 | | |
| 2700 | | 151 | 279 | 561 | | |
| 2800 | | 157 | 289 | 581 | | |
| 2900 | | 162 | 299 | 602 | | |
| 3000 | | 168 | 310 | | | |
| 3100 | | 174 | 320 | | | |
| 3200 | | 179 | 330 | | | |
| 3300 | | 185 | 341 | | | |
| 3400 | | 190 | 351 | | | |
| 3500 | | 196 | 361 | | | |
| 3600 | | 202 | 372 | | | |
| 3700 | | 207 | 382 | | | |
| 3800 | | 213 | 392 | | | |
| 3900 | | 218 | 402 | | | |
| 4000 | | 224 | 413 | | | |
| 4100 | | 230 | 423 | | | |
| 4200 | | 235 | 433 | | | |
| 4300 | | 241 | 444 | | | |
| 4400 | | 246 | 454 | | | |
| 4500 | | 252 | 464 | | | |
| 4600 | | 258 | 475 | | | |
| 4700 | | 263 | 485 | | | |
| 4800 | | 269 | 495 | | | |

TABLE 1-continued

| Engine Speed (rpm) | Engine-driven pump/motor flow rate (liters/min) | Driveline-driven pump/motor flow rate (liters/min; 1st gear) | Driveline-driven pump/motor flow rate (liters/min; 2nd gear) | Driveline-driven pump/motor flow rate (liters/min; 3rd gear) | Driveline-driven pump/motor flow rate (liters/min; 4th gear) | Driveline-driven pump/motor flow rate (liters/min; 5th gear) |
|---|---|---|---|---|---|---|
| 4900 | | 274 | 506 | | | |
| 5000 | | 280 | 516 | | | |

As can be seen in Table 1, the maximum permissible operating speed of each of the first and second reversible pump/motors 74, 78 serves as a limitation on when each of the reversible pump/motors 74, 78 can operate as pumps within the operational range of the engine 18 (i.e., 0-5000 rpm) and the vehicle 14 (i.e., first through fifth gears). Table 1 is illustrated graphically in FIG. 5.

Figure 5:
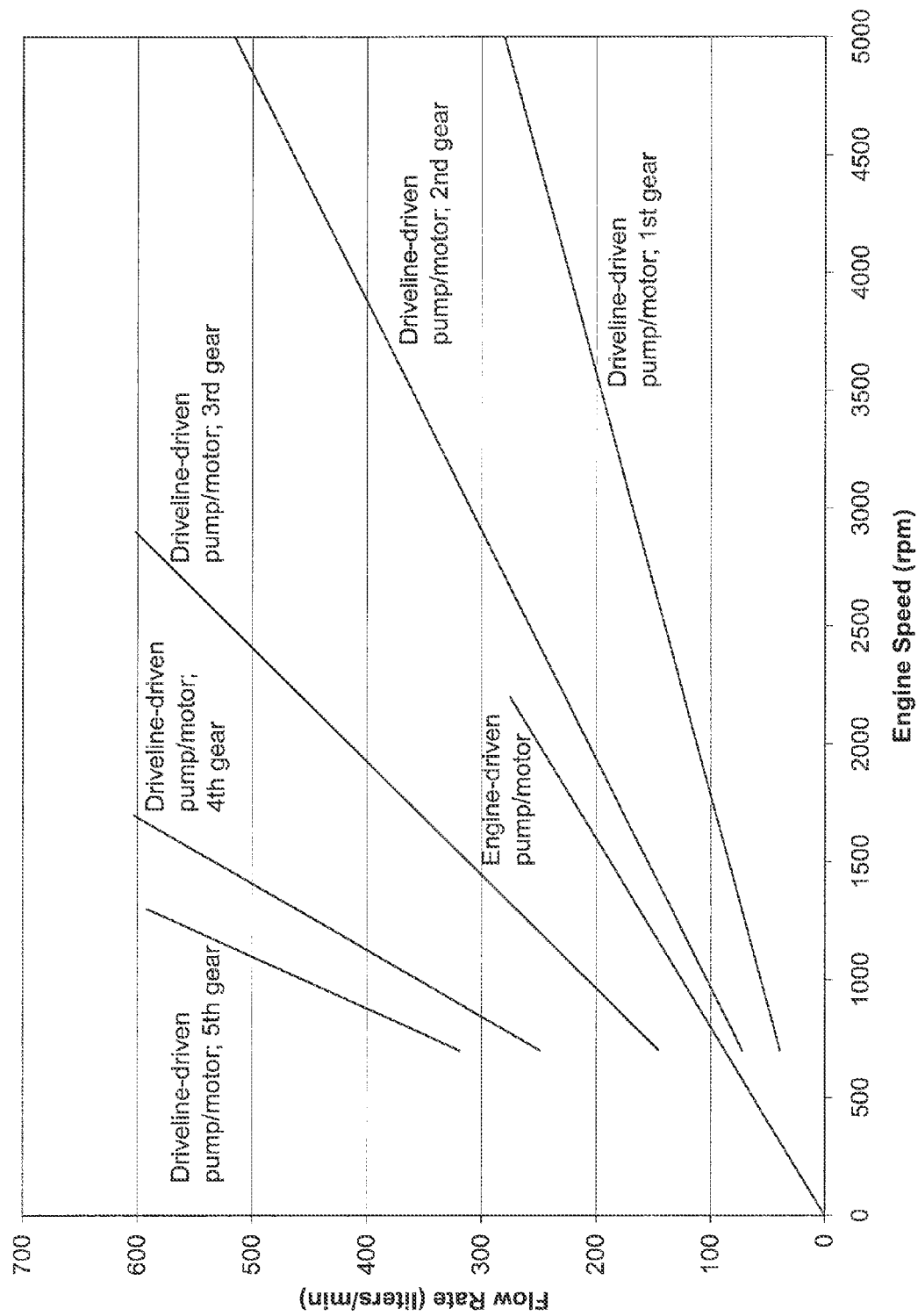
FIG. 5 is a graph of flow rate versus engine speed of the data included in Table 1.

With reference to FIG. 5, should the system 10 require a flow rate of pressurized working fluid at any time when the engine 18 is operating below about 700 rpm (i.e., while the engine 18 is idling and the vehicle 14 is stationary), the first reversible pump/motor 74 must be used because no torque input is provided to the second reversible pump/motor 78 when the vehicle 14 is stationary. Likewise, should the system 10 require a flow rate of pressurized working fluid at any time when the engine 18 is operating above about 2200 rpm (i.e., the maximum operating speed of the pump/motor 74), the second reversible pump/motor 78 must be used. However, the second reversible pump/motor 78 is only operable during operation of the vehicle 14 in first, second, and third gears of the transmission 22 above an engine speed of about 2200 rpm. Further, as discussed above, the ECU 150 may control the torque input delivered to each of the reversible pump/motors 74, 78 to provide an optimized flow rate of the pressurized working fluid produced by the combination of the first and second reversible pump/motors 74, 78. For example, the auxiliary hydraulic system of the vehicle 14 might require a flow rate of pressurized working fluid of about 250 liters/min when the engine 18 is operating between about 1000-1500 rpm and the transmission 22 is in fourth gear. To accommodate this requirement, the ECU 150 may partially engage both of the clutches 146, 162 to deliver a torque input to each of the first and second reversible pump/motors 74, 78 to operate the respective pump/motors 74, 78 as pumps to provide a combined flow rate of about 200 liters/min. By incorporating this capability into the system 10, the functionality and efficiency of the system 10 is increased over the operating range of the engine 18 (i.e., 0-5000 rpm) and the vehicle 14 (i.e., first through fifth gears). It should be understood that the data provided in Table 1 and FIG. 5 is representative of reversible pump/motors having a displacement of 125 cc/rev and 355 rev/min, respectively, and a five-speed transmission having the gear ratios described above. Alternatively, different flow rate data than that shown in Table 1 and FIG. 5 would result from using reversible pump/motors having different displacements and/or a transmission having a different number of speeds and/or gear ratios.

When the vehicle 14 undergoes acceleration or another operation where propulsion assistance is needed, one or both of the reversible pump/motors 74, 78 function as a motor. The compressed gas acts on the piston 90 in the accumulator 70, thereby maintaining the working fluid at a high pressure. Upon sensing the acceleration condition (e.g., using input from a throttle position sensor), the ECU 150 engages the clutches 146, 162 and actuates the isolation valves 94, 166, 170 to open the valves 94, 166, 170 and permit the flow of pressurized working fluid in the direction of arrow B. High-pressure working fluid flows from the accumulator 70, through the fluid passageway 98, through the respective fluid passageway branches 98', 98", and into the respective reversible pump/motors 74, 78 to drive the reversible pump/motors 74, 78. The first reversible pump/motor 74 provides an additional torque input to the output shaft 34 of the engine 18, while the second reversible pump/motor 78 provides an additional torque input to the output shaft 50 of the transmission 22, thereby assisting the vehicle's acceleration or other energy-expending operation. The isolation valve 118 in the fluid passageway 110 would remain closed to prevent the pressurized working fluid from directly returning to the reservoir 66. Low-pressure working fluid then exits the reversible pump/motors 74, 78, flows through the respective fluid passageway branches 114', 114" in the direction of arrow C before converging into the fluid passageway 114, through the working fluid passageway 114, through the heat exchanger 130 and the filter 134 positioned in the fluid passageway 114, and is subsequently returned to the reservoir 66. Alternatively, only the second reversible pump/motor 78 may be employed to provide an additional torque input to the transmission output shaft 50 because of the inherent inefficiencies or losses associated with torque transfer through the torque converter 26. Also, the larger size or displacement of the second reversible pump/motor 78 would allow the pump/motor 78 when operating as a motor to provide a larger additional torque input to the vehicle's driveline with higher efficiency compared to the additional torque input available from the first reversible pump/motor 74.

In yet another mode of operation of the system 10, the first reversible pump/motor 74 may be operable as a motor to start the engine 18 using energy stored in the accumulator 70. This mode of operation may be employed to turn off the engine 18 when the vehicle 14 is stationary to reduce extended periods of engine idling. In another mode of operation of the system 10, the first reversible pump/motor 74 may be operable as a pump to circulate working fluid through the heat exchanger 130 and filter 134 to cool the working fluid and remove debris from the working fluid, respectively, when the vehicle 14 is stationary and/or prior to movement of the vehicle 14. Further, in yet another mode of operation of the system 10, the first reversible pump/motor 74 may be operable as a pump to circulate working fluid through the system 10 to pre-heat the working fluid prior to movement or operation of the vehicle 14. In these modes of operation in which the reversible pump/motor 74 is operating as a pump, the ECU 150 may open the valve 118 to allow the circulating working fluid to flow through the passageway 110 prior to merging with the fluid passageway 114 including the heat exchanger 130 and filter 134.

Figure 2:
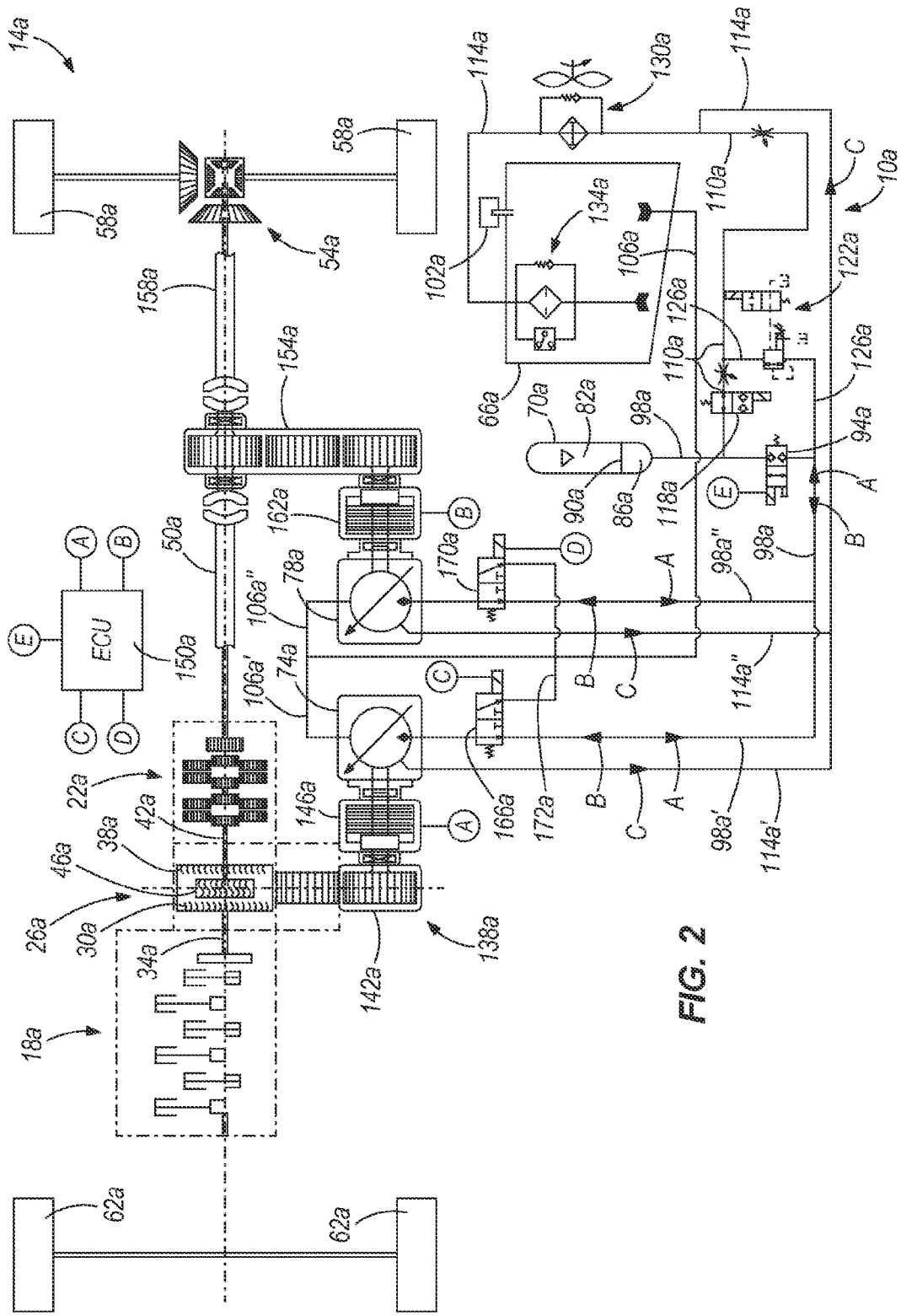
FIG. 2 is a schematic of a second construction of an energy storage system for a hybrid vehicle of the present invention.

FIG. 2 illustrates a schematic of a second construction of an energy storage system 10a for a hybrid vehicle 14a, with like components having like reference numerals with the addition of letter "a." Particularly, the energy storage system 10a differs from the energy storage system 10 of FIG. 1 in that the first reversible pump/motor 74a is positioned between the engine 18a and the transmission 22a, and the reversible pump/motor 74a is drivably coupled to a power take-off (i.e., a "live" PTO interface with the transmission 22a) of the engine 18a, typically positioned near the front of the transmission 22a. In other words, the power take-off may include a shaft in the transmission 22a that is positioned forward of the torque converter 26a and is directly connected to the engine output shaft 34a and rotating at the same speed as the engine output shaft 34a. Alternatively, the turbine 30a of the torque converter 26a may also function as the power take-off to which the first reversible pump/motor 74a is drivably coupled. Depending upon the particular configuration of the vehicle incorporating the energy storage system 10 or 10a, the energy storage system 10a may be more desirable than the system 10 (e.g. the vehicle 14a may not utilize a front accessory drive system such as the accessory drive system 138 shown in FIG. 1). The operation of the energy storage system 10a is substantially similar to that described above for the energy storage system 10 of FIG. 1.

Figure 3:
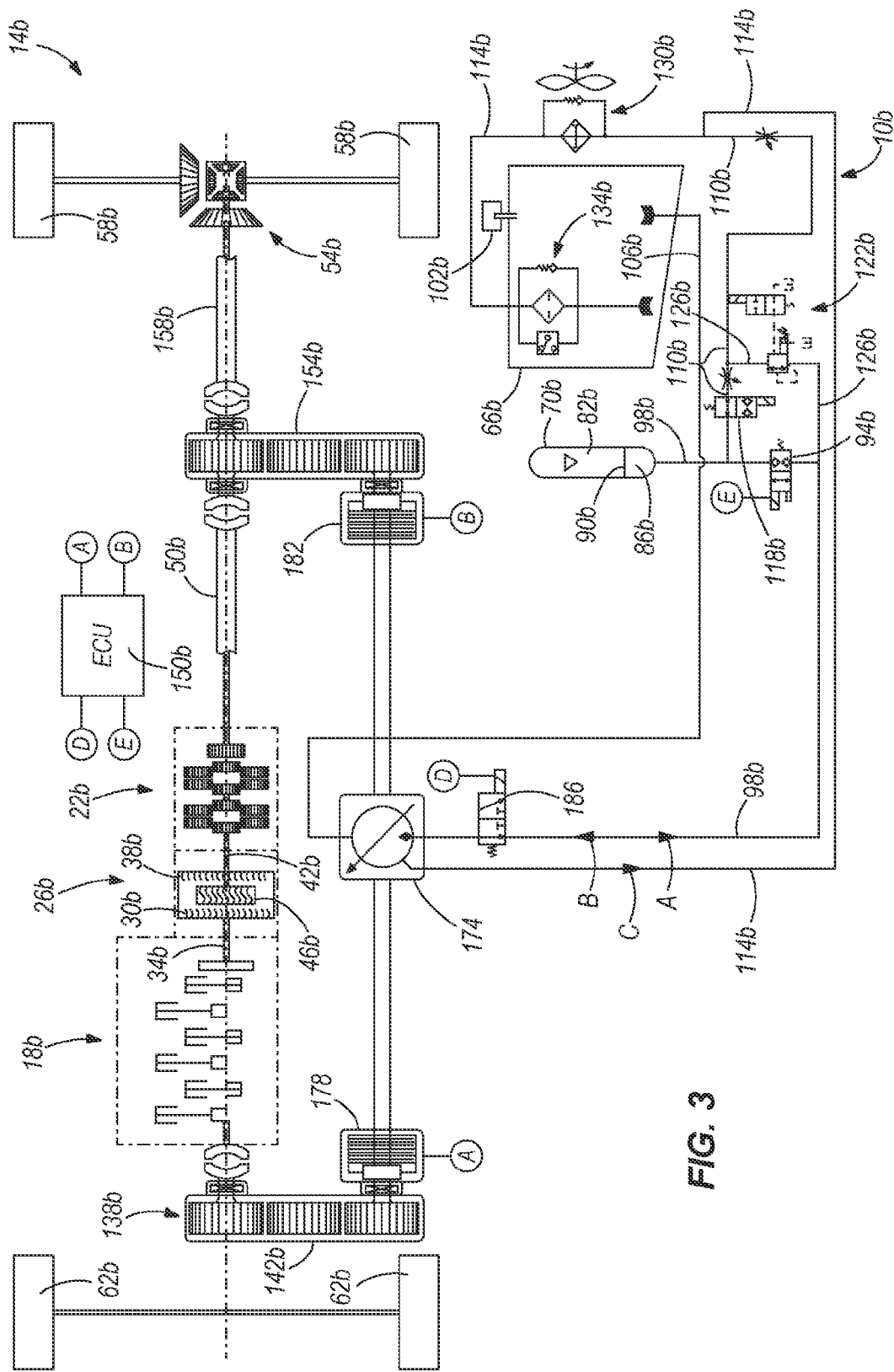
FIG. 3 is a schematic of a third construction of an energy storage system for a hybrid vehicle of the present invention.

FIG. 3 illustrates a schematic of a third construction of an energy storage system 10b for a hybrid vehicle 14b, with like components having like reference numerals with the addition of letter "b." The primary difference between the energy storage system 10b illustrated in FIG. 3 and the energy storage system 10 illustrated in FIG. 1 is that the system 10b includes only a single reversible pump/motor 174 operably coupled to the accumulator 70b. The reversible pump/motor 174 is configured as a variable displacement, axial-piston, swashplate-design pump/motor, such as a Bosch Rexroth Model No. A4VSO variable displacement, axial piston reversible pump/motor. Similar to the system 10 of FIG. 1, the reversible pump/motor 174 is sized having a maximum displacement of 125 cc/rev of the input shaft of the pump/motor 174. Alternatively, the reversible pump/motor 174 may be sized having a different maximum displacement depending upon the particular configuration of the vehicle 14a. Further, the reversible pump/motor 174 may be configured having a constant displacement rather than a variable displacement.

With continued reference to FIG. 3, the reversible pump/motor 174 is selectively drivably coupled to the output shaft 34b of the engine 18b at a location forward of the transmission 22b (i.e., relative to the front and rear of the vehicle 14b). Specifically, the reversible pump/motor 174 is selectively drivably coupled to an accessory drive system 138b located near the front of the engine 18b. Alternatively, in a transverse mounting arrangement of the engine 18b, the reversible pump/motor 174 may be selectively drivably coupled to an accessory drive system located near the side of the engine 18b relative to its placement in the vehicle 14b. The accessory drive system 138b also includes an offset gearbox 142b operable to transfer torque between the engine output shaft 34b and the reversible pump/motor 174. Although the illustrated offset gearbox 142b is configured having a 1:1 input/output ratio, the gearbox 142b may be configured having a lower or higher input/output ratio.

Also, in the illustrated construction of the system 10b, a first clutch 178 is positioned between the reversible pump/motor 174 and the engine output shaft 34b to allow the reversible pump/motor 174 to be selectively drivably coupled to the engine output shaft 34b. As shown in FIG. 3, an ECU 150b of the vehicle 14b is operable to selectively actuate the clutch 178 between a disengaged configuration, in which no torque transfer occurs between the engine output shaft 34b and the reversible pump/motor 174, and an engaged configuration, in which torque transfer occurs between the engine output shaft 34b and the reversible pump/motor 174. The clutch 178 may be configured as an electric clutch or an electromagnetic clutch operable to interface directly with the ECU 150b, or the clutch 178 may be pneumatically or hydraulically actuated by the ECU 150b through an intermediate controller (not shown). Also, the ECU 150b may control the degree of engagement of the clutch 178, such that a variable amount of torque may be transferred between the engine output shaft 34b and the reversible pump/motor 174 due to a controlled amount of slippage in the clutch 178. The connection between the ECU 150b and the clutch 178 (indicated by letter "A") may be wired or wireless (for an electric or electromagnetic clutch configuration), or, the connection between the ECU 150b and the intermediate controller for the pneumatically or hydraulically-actuated clutch 178 may be wired or wireless.

With continued reference to FIG. 3, the reversible pump/motor 174 is also selectively drivably coupled to the output shaft 50b of the transmission 22b at a location rearward of the transmission 22b (i.e., relative to the front and rear of the vehicle 14b). The reversible pump/motor 174 is selectively drivably coupled to the transmission output shaft 50b via an offset gearbox 154b operable to transfer torque between the transmission output shaft 50b and the reversible pump/motor 174. Although the illustrated offset gearbox 154b is configured having a 1:1 input/output ratio, the gearbox 154b may be configured having a lower or higher input/output ratio. Another output shaft 158b interconnects the offset gearbox 154b and the rear differential 54b. Alternatively, the output shaft 158b may be omitted, and the gearbox 154b may be directly coupled to the rear differential 54b.

A second clutch 182 is positioned between the reversible pump/motor 174 and the output shaft 50b of the transmission 22b to allow the reversible pump/motor 174 to be selectively drivably coupled to the transmission output shaft 50b. In a manner similar to that described above with respect to the first clutch 178, the ECU 150b is operable to selectively actuate the second clutch 182 between a disengaged configuration, in which no torque transfer occurs between the transmission output shaft 50b and the reversible pump/motor 174, and an engaged configuration, in which torque transfer occurs between the transmission output shaft 50b and the reversible pump/motor 174. The clutch 182 may be configured as an electric clutch or an electromagnetic clutch operable to interface directly with the ECU 150b, or the clutch 178 may be pneumatically or hydraulically actuated by the ECU 150b through an intermediate controller (not shown). The ECU 150b may control the degree of engagement of the clutch 182, such that a variable amount of torque may be transferred between the transmission output shaft 50b and the reversible pump/motor 174 due to a controlled amount of slippage in the clutch 182. The connection between the ECU 150b and the clutch 182 (indicated by letter "B") may be wired or wireless (for an electric or electromagnetic clutch configuration), or, the connection between the ECU 150b and the intermediate controller for the pneumatically or hydraulically-actuated clutch 182 may be wired or wireless.

With continued reference to FIG. 3, the reversible pump/motor 174 is in fluid communication with the reservoir 66b to receive low-pressure working fluid via a fluid passageway 106b. Further, the reversible pump/motor 174 is in fluid communication with the accumulator 70b via a fluid passageway 98b to deliver pressurized working fluid to the accumulator 70b when operating as a pump, and to receive pressurized working fluid from the accumulator 70b when operating as a motor. The reversible pump/motor 174 is also in fluid communication with the reservoir 66b to return low-pressure working fluid to the reservoir 66b via a fluid passageway 114b.

The energy storage system 10b also includes an isolation valve 186 positioned in the fluid passageway 98b to selectively block the flow of working fluid through the fluid passageway 98b. Each of the isolation valves 94b, 186 may be configured as a poppet valve, ball valve, spool valve, gate valve, cartridge valve, needle valve, block valve, etc. Further, each of the isolation valves 94b, 186 is solenoid-actuated to open and spring-biased to close. The ECU 150b controls the actuation of the valves 94b, 186 to open the valves 94b, 186 and to allow the valves 94b, 186 to close. The connection between the ECU 150b and the valves 186, 94b (indicated by letters "D" and "E," respectively) may be wired or wireless.

By allowing the torque input to the reversible pump/motor 174 to originate from either the engine output shaft 34b or the transmission output shaft 50b, the energy storage system 10b is operable in several different modes. In a first mode, for example, when it is desired to decelerate or reduce the speed of the vehicle 14b, the second clutch 186 is engaged to allow the vehicle's axle or driveline (i.e., the rear wheels 58b, rear differential 54b, and the transmission output shafts 50b, 158b) to drive the reversible pump/motor 174 as a pump to recover the kinetic energy of the vehicle 14b. Upon sensing the braking or equivalent energy-absorption condition, the ECU 150b engages the second clutch 182 and actuates the isolation valves 94b, 186 to open the valves 94b, 186. Then, the reversible pump/motor 174 draws low-pressure working fluid from the reservoir 66b through the fluid passageway 106b and pressurizes the working fluid. The resultant pressurized working fluid is discharged from the reversible pump/motor 174, flows through the isolation valve 186, through the fluid passageway 98b in the direction of arrow A, through the isolation valve 94b, and into the working fluid chamber 86b of the accumulator 70b. The isolation valve 118b in the fluid passageway 110b remains closed to prevent the pressurized working fluid from returning to the reservoir 66b. As the pressurized working fluid flows into the accumulator 70b, the piston 90b is displaced upwardly, thereby compressing the gas in the accumulator 70b. The work performed by the piston 90b to compress the gas is stored for later use to power the axle or driveline of the vehicle 14b. Alternatively, the stored energy in the accumulator 70b may be used to provide power to an auxiliary hydraulic system of the vehicle 14b (e.g., a tailgate lift or hoist, a winch, a hydraulic cylinder, etc.). As a further alternative, the pressurized working fluid provided by the reversible pump/motor 174 may be immediately used, rather than being stored in the accumulator 70b, to provide power to the vehicle's auxiliary hydraulic system.

Of course, this mode of operation of the system 10b is only available when the vehicle 14b is moving because an input torque to the reversible pump/motor 174 is required to operate the pump/motor 174 as a pump. However, because the reversible pump/motor 174 may also receive a torque input from the engine output shaft 34b forward of the transmission 22b, the reversible pump/motor 174 may be provided with a torque input from the engine 18b when the vehicle 14b is either stationary or moving. As such, in another mode of operation of the system 10b, the reversible pump/motor 174 is operable as a pump to recover the rotational kinetic energy of the engine output shaft 34b when the ignition of the engine 18b is turned off (e.g., when the vehicle 14b is decelerating or stationary to reduce extended periods of engine idling). In yet another mode of operation of the system 10b, the reversible pump/motor 174 is operable as a pump using a torque input from the engine 18b to provide pressurized working fluid, either directly or via the accumulator 70b, to the auxiliary hydraulic system of the vehicle 14b to power the auxiliary hydraulic system regardless of whether the vehicle 14b is stationary or moving. In a further mode of operation of the system 10b, the reversible pump/motor 174 is operable as a pump using a torque input from the engine 18b to provide pressurized working fluid to the accumulator 70b to precharge the accumulator 70b prior to movement of the vehicle 14b.

To operate the reversible pump/motor 174 as a pump under any of the above-described modes of operation of the system 10b, the ECU 150b engages the first clutch 178 and actuates the isolation valves 94b, 186 to open the valves 94b, 186. Then, the reversible pump/motor 174 draws low-pressure working fluid from the reservoir 66b through the fluid passageway 106b and pressurizes the working fluid. The resultant pressurized working fluid is discharged from the reversible pump/motor 174, flows through the isolation valve 186, through the fluid passageway 98b in the direction of arrow A, through the isolation valve 94b, and into the working fluid chamber 86b of the accumulator 70b. The isolation valve 118b in the fluid passageway 110b remains closed to prevent the pressurized working fluid from returning to the reservoir 66b.

Depending upon the mode of operation of the system 10b and the particular operating conditions of the vehicle 14b, the ECU 150b may control which of the first and second clutches 178, 182 is engaged to drive the reversible pump/motor 174 as a pump. Table 2 below illustrates the maximum flow rates that the reversible pump/motor 174 is capable of creating, with respect to the rotational speed of the engine 18b and the particular gear ratio of the transmission 22b. The values used for the transmission gear ratios include: 6.34:1 first gear; 3.44:1 second gear; 1.71:1 third gear; 1:1 fourth gear; and 0.78:1 fifth gear.

TABLE 2

| Engine Speed (rpm) | Engine-driven pump/motor flow rate (liters/min) | Driveline-driven pump/motor flow rate (liters/min; 1st gear) | Driveline-driven pump/motor flow rate (liters/min; 2nd gear) | Driveline-driven pump/motor flow rate (liters/min; 3rd gear) | Driveline-driven pump/motor flow rate (liters/min; 4th gear) | Driveline-driven pump/motor flow rate (liters/min; 5th gear) |
|---|---|---|---|---|---|---|
| 0 | 0 | No fluid output when vehicle is idling and stationary | | | | |
| 100 | 13 | | | | | |
| 200 | 25 | | | | | |
| 300 | 38 | | | | | |
| 400 | 50 | | | | | |
| 500 | 63 | | | | | |
| 600 | 75 | | | | | |
| 700 | 88 | 14 | 25 | 51 | 88 | 112 |
| 800 | 100 | 16 | 29 | 58 | 100 | 128 |
| 900 | 113 | 18 | 33 | 66 | 113 | 144 |
| 1000 | 125 | 20 | 36 | 73 | 125 | 160 |

TABLE 2-continued

| Engine Speed (rpm) | Engine-driven pump/motor flow rate (liters/min) | Driveline-driven pump/motor flow rate (liters/min; 1st gear) | Driveline-driven pump/motor flow rate (liters/min; 2nd gear) | Driveline-driven pump/motor flow rate (liters/min; 3rd gear) | Driveline-driven pump/motor flow rate (liters/min; 4th gear) | Driveline-driven pump/motor flow rate (liters/min; 5th gear) |
|---|---|---|---|---|---|---|
| 1100 | 138 | 22 | 40 | 80 | 138 | 176 |
| 1200 | 150 | 24 | 44 | 88 | 150 | 192 |
| 1300 | 163 | 26 | 47 | 95 | 163 | 208 |
| 1400 | 175 | 28 | 51 | 102 | 175 | 224 |
| 1500 | 188 | 30 | 55 | 110 | 188 | 240 |
| 1600 | 200 | 32 | 58 | 117 | 200 | 256 |
| 1700 | 213 | 34 | 62 | 124 | 213 | 272 |
| 1800 | 225 | 35 | 65 | 132 | 225 | |
| 1900 | 238 | 37 | 69 | 139 | 238 | |
| 2000 | 250 | 39 | 73 | 146 | 250 | |
| 2100 | 263 | 41 | 76 | 154 | 263 | |
| 2200 | 275 | 43 | 80 | 161 | 275 | |
| 2300 | These values | 45 | 84 | 168 | These values | |
| 2400 | exceed the | 47 | 87 | 175 | exceed the | |
| 2500 | maximum | 49 | 91 | 183 | maximum | |
| 2600 | permissible | 51 | 94 | 190 | permissible | |
| 2700 | operating | 53 | 98 | 197 | operating | |
| 2800 | speed of the | 55 | 102 | 205 | speed of the | |
| 2900 | Rexroth | 57 | 105 | 212 | Rexroth A4VSO | |
| 3000 | A4VSO | 59 | 109 | 219 | 125 cc/rev | |
| 3100 | 125 cc/rev | 61 | 113 | 227 | pump/motor | |
| 3200 | pump/motor | 63 | 116 | 234 | | |
| 3300 | | 65 | 120 | 241 | | |
| 3400 | | 67 | 124 | 249 | | |
| 3500 | | 69 | 127 | 256 | | |
| 3600 | | 71 | 131 | 263 | | |
| 3700 | | 73 | 134 | 270 | | |
| 3800 | | 75 | 138 | | | |
| 3900 | | 77 | 142 | | | |
| 4000 | | 79 | 145 | | | |
| 4100 | | 81 | 149 | | | |
| 4200 | | 83 | 153 | | | |
| 4300 | | 85 | 156 | | | |
| 4400 | | 87 | 160 | | | |
| 4500 | | 89 | 164 | | | |
| 4600 | | 91 | 167 | | | |
| 4700 | | 93 | 171 | | | |
| 4800 | | 95 | 174 | | | |
| 4900 | | 97 | 178 | | | |
| 5000 | | 99 | 182 | | | |

As can be seen in Table 2, the maximum permissible operating speed of the reversible pump/motor 174 serves as a limitation when the reversible pump/motor 174 can operate as a pump within the operational range of the engine 18b (i.e., 0-5000 rpm) and the vehicle 14b (i.e., first through fifth gears). Table 2 is illustrated graphically in FIG. 6.

Figure 6:
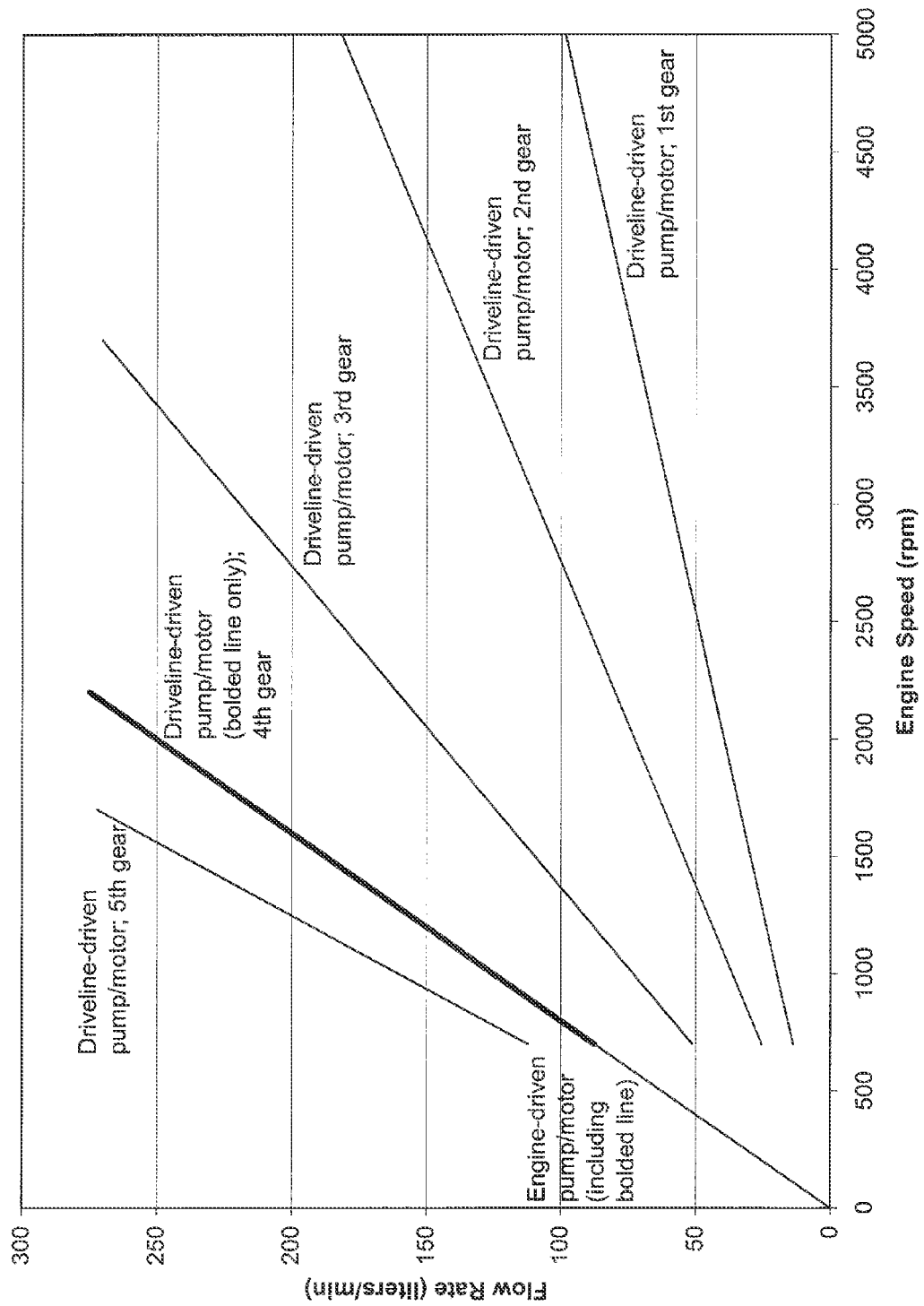
FIG. 6 is a graph of flow rate versus engine speed of the data included in Table 2.

With reference to FIG. 6, should the system 10b require a flow rate of pressurized working fluid at any time when the engine 18b is operating below about 700 rpm (i.e., while the engine 18b is idling and the vehicle 14b is stationary), the first clutch 178 must be engaged to drive the reversible pump/motor 174 because no torque input can be provided to the reversible pump/motor 174 through the second clutch 182 when the vehicle 14b is stationary. Likewise, should the system 10b require a flow rate of pressurized working fluid at any time when the engine 18b is operating above about 2200 rpm, the second clutch 182 must be engaged to drive the reversible pump/motor 174. However, the reversible pump/motor 174 is only operable during operation of the vehicle 14b in first, second, and third gears of the transmission 22b above about 2200 rpm of the engine 18b. By sensing engine speed and the transmission gear ratio, the ECU 150b may control which of the first and second clutches 178, 182 to engage to drive the reversible pump/motor 174 as a pump to provide pressurized working fluid during any of the operational modes described above. For example, the auxiliary hydraulic system of the vehicle 14b might require a flow rate of pressurized working fluid of about 100 liters/min when the engine 18b is operating between about 1000-1500 rpm and the transmission 22b is in third gear. To accommodate this requirement, toward the lower end of this engine speed range, the ECU 150b may partially engage the first clutch 178 to provide the reversible pump/motor 174 with a torque input from the engine output shaft 34b that would yield the 100 liters/min desired flow rate from the reversible pump/motor 174. Near the higher end of this engine speed range, the ECU 150b may disengage the first clutch 178 and fully or partially engage the second clutch 182 to provide the reversible pump/motor 174 with a torque input from the transmission output shaft 50b that would yield the 100 liters/min desired flow rate from the reversible pump/motor 174. Such a transition may be rapidly performed by the ECU 150b such that the pressurized working fluid output by the reversible pump/motor 174 is substantially uninterrupted. By incorporating this capability into the system 10b, the functionality and efficiency of the system 10b is increased over the operating range of the engine 18b (i.e., 0-5000 rpm) and the vehicle 14b (i.e., first through fifth gears).

When the vehicle 14b undergoes acceleration or another operation where propulsion assistance is needed, the reversible pump/motor 174 functions as a motor. The compressed gas acts on the piston 90b in the accumulator 70b, thereby maintaining the working fluid at a high pressure. Upon sensing the acceleration condition (e.g., using input from a throttle position sensor), the ECU 150b disengages the first clutch 178, engages the second clutch 182, and actuates the isolation valves 94b, 186 to open the valves 94b, 186 and permit the flow of pressurized working fluid in the direction of arrow B. High-pressure working fluid flows from the accumulator 70b, through the fluid passageway 98b, and into the reversible pump/motor 174 to drive the reversible pump/motor 174. The reversible pump/motor 174 provides an additional torque input to the output shaft 50b of the transmission 22b, thereby assisting the vehicle's acceleration or other energy-expending operation. The isolation valve 118b in the fluid passageway 110b would remain closed to prevent the pressurized working fluid from directly returning to the reservoir 66b. Low-pressure working fluid then exits the reversible pump/motor 174, flows through the fluid passageway 114b in the direction of arrow C, through the heat exchanger 130b and the filter 134b positioned in the fluid passageway 114b, and is subsequently returned to the reservoir 66b.

In yet another mode of operation of the system 10b, the reversible pump/motor 174 may be operable as a motor to start the engine 18b using energy stored in the accumulator 70b. This mode of operation may be employed to turn off the engine 18b when the vehicle 14b is stationary to reduce extended periods of engine idling. To implement this mode of operation, the ECU 150b engages the first clutch 178 to allow the reversible pump/motor 174 to provide a torque input to the engine output shaft 34b to start the engine 18b. Pressurized working fluid is delivered to the reversible pump/motor 174 in this mode of operation in the same manner as that described above for providing propulsion assistance to the vehicle 14b. In another mode of operation of the system 10b, the reversible pump/motor 174 may be operable as a pump by engaging the first clutch 178 to circulate working fluid through the heat exchanger 130b and filter 134b to cool the working fluid and remove debris from the working fluid, respectively, when the vehicle 14b is stationary and/or prior to movement of the vehicle 14b. Further, in yet another mode of operation of the system 10b, the reversible pump/motor 174 may be operable as a pump by engaging the first clutch 178 to circulate working fluid through the system 10b to pre-heat the working fluid prior to movement or operation of the vehicle 14b. In these modes of operation in which the reversible pump/motor 174 is operating as a pump, the ECU 150b may open the valve 118b to allow the circulating working fluid to flow through the passageway 110b prior to merging with the fluid passageway 114b including the heat exchanger 130b and filter 134b.

Figure 4:
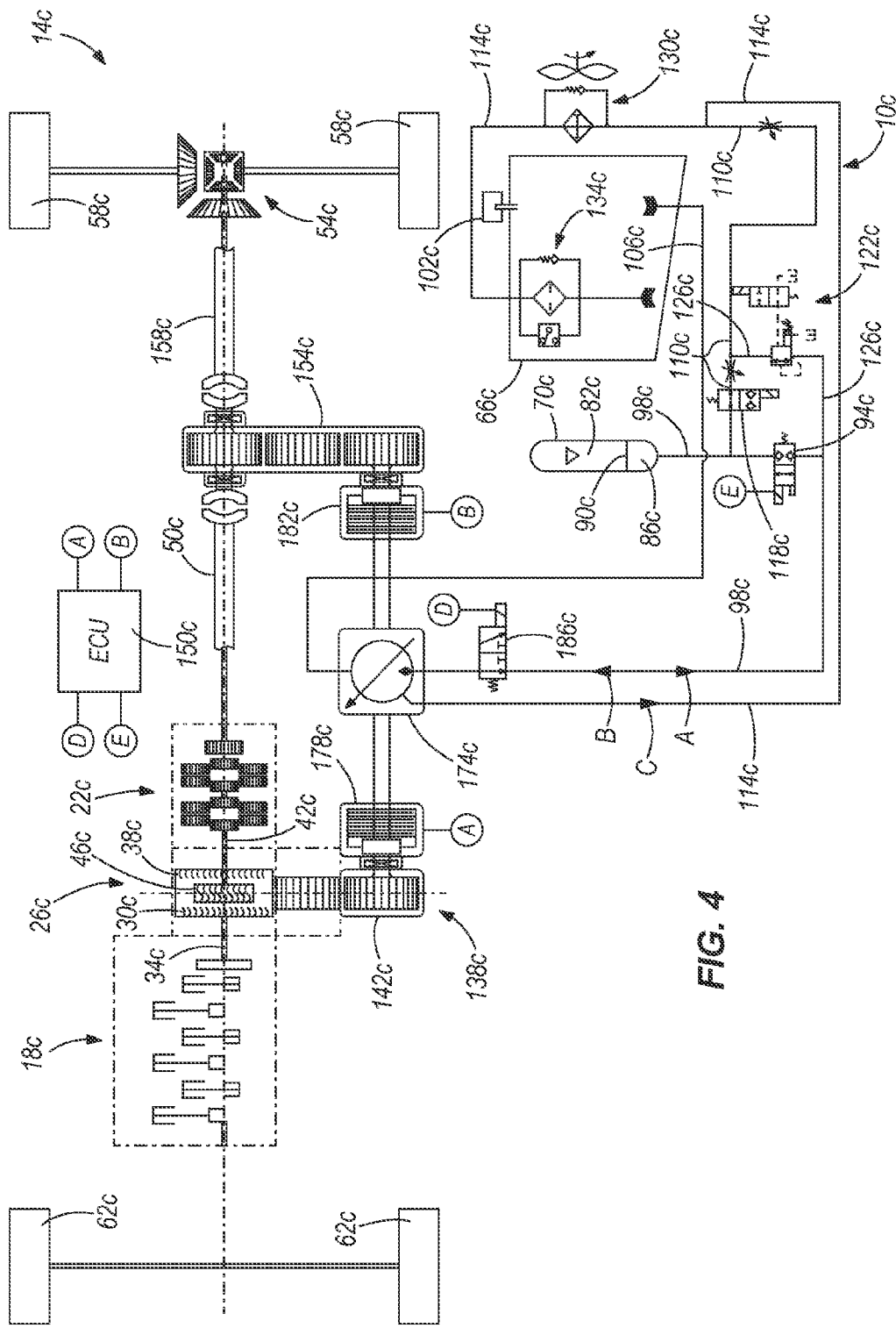
FIG. 4 is a schematic of a fourth construction of an energy storage system for a hybrid vehicle of the present invention.

FIG. 4 illustrates a schematic of a fourth construction of an energy storage system 10c for a hybrid vehicle 14c, with like components having like reference numerals with the addition of letter "c." Particularly, the energy storage system 10c differs from the energy storage system 10b of FIG. 3 in that the first clutch 178c is drivably coupled to the power take-off or "live" PTO interface of the engine 18c. Depending upon the particular configuration of the vehicle incorporating the energy storage system 10b or 10c, the energy storage system 10c may be more desirable than the system 10b (e.g. the vehicle 14c may not utilize a front accessory drive system such as the accessory drive system 138b shown in FIG. 3). The operation of the energy storage system 10c is substantially similar to that described above for the energy storage system 10b of FIG. 3.

Various features of the invention are set forth in the following claims.

What is claimed is:

1. A method of operating a hybrid vehicle including an internal combustion engine having an output shaft and a transmission operably coupled to the output shaft, the method comprising:
    providing an accumulator containing working fluid and gas;
    providing a reversible pump/motor;
    selectively drivably coupling the output shaft of the engine and the reversible pump/motor with a first clutch;
    selectively drivably coupling an output shaft of the transmission and the reversible pump/motor with a second clutch;
    discharging pressurized working fluid from the accumulator to the reversible pump/motor when operating as a motor;
    receiving pressurized working fluid discharged by the reversible pump/motor at the accumulator when operating as a pump; and
    controlling which of the first and second clutches to engage based upon the rotational speeds of the output shafts of the engine and the transmission, respectively.

2. The method of claim 1, wherein selectively drivably coupling the transmission output shaft and the reversible pump/motor includes engaging the second clutch to operate the reversible pump/motor as a motor when the vehicle is at least one of stationary and moving.

3. The method of claim 1, wherein selectively drivably coupling the transmission output shaft and the reversible pump/motor includes engaging the second clutch to operate the reversible pump/motor as a pump only when the vehicle is moving.

4. The method of claim 3, wherein the second clutch is engaged when the engine is operating above about 2200 rpm.

5. The method of claim 4, wherein the second clutch is engaged only when the transmission is in first, second, or third gear and the engine is operating above about 2200 rpm.

6. The method of claim 1, wherein selectively drivably coupling the engine output shaft and the reversible pump/motor includes engaging the first clutch to operate the reversible pump/motor as a pump when the vehicle is idling and stationary.

* * * * *